Patented Feb. 23, 1943

2,311,777

UNITED STATES PATENT OFFICE 2,311,777

PHENOL SYNTHESIS AND CATALYST

Lawrence V. Redman, Montclair, N. J., assignor, by mesne assignments, to Bakelite Corporation, a corporation of New Jersey No Drawing. Application July 17, 1931, Serial No. 551,555

22 Claims. (Cl. 260—629)

This invention relates to the production of aromatic hydroxy compounds from the corresponding halogenated aromatic compounds and water vapor, and to certain catalysts which have been found to catalyze the reaction.

The prior art discloses the production of phenol from chlorbenzol or brombenzol and water in the liquid phase, and the Lloyd and Kennedy Patent No. 1,735,327 discloses the production of phenol from chlorinated or brominated benzol using silica ($SiO_2$) as a catalyst.

It has been discovered that certain salts, hereinafter mentioned, are excellent catalyzers for converting halogenated aromatic compounds into the corresponding hydroxy compounds, and are highly efficient in that, in general, they give a higher yield of the hydroxy compounds with less by-products than does silica and also catalyze the reaction at a lower temperature. In general, it may be said that the salts are those which have in the positive radical the metals, magnesium, aluminum, calcium, copper and zinc, that is, metals which lie in groups 1, 2, and 3, and series 3, 4 and 5 of the periodic table, excluding the metal sodium. If a line be drawn on the periodic table through the metals Cu, Ca, and Al, it will be seen that the metals used in the positive radical of the catalysts lie on this line or, like Mg and Zn, are next to it, and include the metals whose oxides are weakly basic. When potassium is in the positive radical a fair catalyst is formed but the potassium compounds are so strongly reactive with the halogen acid which is formed during the reaction that they quickly become ineffective. For practical use, scandium and gallium are not included, because of their rarity and their cost, which is at present deemed prohibitive, although they lie within the group forming salts which catalyze the reaction. The negative radical of the catalyzing salts includes the elements silicon, phosphorus, sulphur and chlorine, of which silicon and phosphorus are deemed most effective in the form of silicates and phosphates. Salts which include these elements in the positive and negative radicals as above indicated, have a distinct catalytic influence in promoting a reaction between a halogenated benzol or homolog, and water vapor, to form the corresponding phenol and the corresponding halogen acid. The most available halogenated benzol is chlorbenzol and therefore the invention will be explained as applied to this chemical but it should be understood that the invention is not limited to the use thereof. Tests have shown that it is easier to convert brombenzene or a brominated homolog thereof into the corresponding phenol than it is to convert chlorbenzene into phenol but, until the cost of brombenzene decreases, the chlorbenzenes are the only commercially available chemicals to be used in this process.

The catalysts are most easily prepared by precipitation from a dilute water solution. In general, two water soluble salts such as copper nitrate and sodium phosphate, one having the desired positive radical and the other the negative radical of the catalyst, are prepared in a 2% to 5% water solution and mixed at room temperature. The precipitate is thrown out of solution in a very finely divided or colloidal and highly hydrated form. For best results the catalyst should be in the amorphous or colloidal state and may even be on the border-line between the amorphous and crystalline states, but should not be definitely crystalline. It has been discovered that in order to obtain the catalyst in colloidal form or in a form as nearly colloidal as is practicable, the temperature of precipitation should be as low as is possible. As an example, it has been discovered that copper phosphate is more active as a catalyst if precipitated at 2° C. than if precipitated at 100° C., and that there is a gradation of activity depending upon the temperature of precipitation; copper phosphate precipitated at 25° C. is more active than the same salt precipitated at 65° C.

It has been further discovered that copper salts in particular have a relatively great catalytic effect, copper silicate and phosphate being preferred, and moreover, that the joint action of certain of the beforementioned catalysts gives better results than do the individual catalysts. Thus a better catalytic effect is obtained by the joint action of copper phosphate with aluminum phosphate or with alumina, or kaolin than with the individual catalysts. A compound catalyst may be prepared by placing a thin coating of one of the catalysts such as copper phosphate, on a center or core of another of the catalysts such as aluminum phosphate, but the preferred method of forming such a compound catalyst is to precipitate the two salts together. An exceedingly effective catalyst is a mixture of aluminum phosphate and copper phosphate which is preferably prepared by precipitating the salts together from as cold a solution as is practicable. The aluminum phosphate is amorphous and produces a catalyst having amorphous or colloidal characteristics which are increased by the precipitation in the cold solution.

The precipitated catalyst is washed free from soluble salts and then filtered preferably with the application of pressure to give a hard mass. The solid salt is then removed from the filter and dried, leaving the salt in a more or less hydrated form. The catalyst prepared in this way is porous but yet is quite strong and has little tendency to break down in use so that it may be used by itself and need not be mounted on a strengthening support.

Natural minerals such as chrysocolla, azurite and calamine can be used instead of the corresponding synthetic salts but of these natural minerals those with amorphous characteristics, such as chrysocolla, work better than those, such as azurite and calamine, which are more crystalline in character.

In using the catalysts, the large mass is broken into rather small pieces, but preferably not finer than 12 mesh and loaded into the catalyst chamber, and preferably with a pre-heater between the catalyst and the incoming vapors. A relatively large amount of catalyst is used in order that the vapors may be run through the catalyst at a relatively high rate of speed. The vapors should not remain in contact with the catalyst for more than 5 seconds and preferably for only ½ second to 2 seconds. For catalyzing a mixture containing approximately 30 per cent of water vapor and 70 per cent by weight of chlorbenzol vapor, the time of contact of the vapors with the catalyzer may be approximately one second but may vary substantially ½ second and still good results be obtained. As the percentage of water vapor is increased, the time of contact is lowered.

The action is endothermic and consequently the catalytic chamber and the pre-heater must be heated. With the salts above mentioned, the temperature of the reaction is preferably maintained at approximately 500° C. with a general variation of substantially 100° C. on either side. A small yield of phenol is obtained with a temperature as low as 275° C. from vapor which contains approximately 30% steam and 70% chlorbenzene, and the catalysts have been operated at temperatures as high as 600° C. but the lower temperatures are preferred as there is less tendency to form by-products which foul the catalysts and also the rate of plant depreciation is lower.

The reactants are introduced into the catalytic chamber in the vapor phase. The mixture which is easiest to use is one which has approximately 30% of water vapor by weight and 70% of chlorbenzene, as a liquid mixture of water and chlorbenzene having this composition is a constant boiling mixture. As the action is reversible, however, a larger percentage of water vapor is quite frequently used because it tends to drive the reaction in the desired direction that is an excess of water vapor tends to promote the reaction of chlorbenzene and water to form phenol and hydrochloric acid and to retard the reverse action. Also, the vapors may pass over the catalyst at a higher speed as the proportion of water vapor is increased and therefore there is less tendency for the by-products to settle out and foul the catalyst. Moreover, the greater the percentage of water vapor, the less is the tendency toward the formation of by-products and the less is the effect of accidental increases in heat input since the water vapor tends to absorb the excess heat and not appreciably raise the temperature of the catalyst. The excess water vapor also absorbs the halogen acid which is formed during the reaction and sweeps it away from the catalyst, thus decreasing the tendency of the hydrochloric acid to react with the catalyst to lessen its efficiency. However, mixtures containing as much as 85% by weight of chlorbenzene and only 15 parts by weight of water vapor may be used successfully. The advantage of using less water is that a smaller amount of liquid and more concentrated solutions are handled after the synthesis. The water and the chlorbenzene may, if desired, be volatilized separately and then passed into the reaction chamber in measured amounts.

During the operation of the process the atmosphere within the catalytic chamber is strongly reducing and the salts are brought to a low state of oxidation, for instance the cupric salts are reduced to the cuprous state with a visible change from a blue to a whitish color. If the operating conditions of the process are changed and the catalyst is fouled with carbon, it may be regenerated by passing a mixture of steam and air or air alone through the catalytic chamber while heating the catalyst.

The product of the reaction is a mixture of phenol, hydrochloric acid, chlorbenzene, water, and a small amount of by-product. According to one method of treating the reaction products this mixture is allowed to separate into two liquid layers, the by-products, phenol, and chlorbenzene being in one layer, and the water and hydrochloric acid and small amount of phenol being in the other. The phenol is separated from the chlorbenzene and the by-products, and is purified. The chlorbenzene may be returned to the process. The hydrochloric acid may be used to chlorinate fresh quantities of benzene which is then used as one of the reactants.

According to another method of treating the reaction products, the hot vaporized products are passed through or in contact with an alkaline earth oxide, hydroxide or carbonate which immediately reacts with the hydrochloric acid to form the corresponding alkaline earth chloride while the phenol and chlorbenzene pass through unchanged. The alkaline earth oxides or salts also tend to entrain any solid by-products, such as carbon. If the reaction products are treated in this manner, they should pass into contact with the alkaline earth compound as soon as possible after leaving the catalytic chamber so that the phenol and chlorbenzene will remain in the vapor state, and the alkaline earth oxide or hydroxide or carbonate will react with the hydrochloric acid to remove it from the vapors as soon as possible so that there will be practically no tendency for the reaction to reverse itself. The alkaline-earth-halogen-salt which is formed may have a market of its own. For instance, if calcium oxide, hydroxide, or carbonate be used for treating the vaporized reaction products, it entrains some of the solid by-products and reacts chemically with the hydrochloric acid to form calcium chloride while permitting the phenol and chlorbenzene to pass. The calcium chloride has its own industrial uses and market.

Although, for illustrative purposes, the invention has been explained in connection with the reaction between chlorbenzene and water vapor, the features of the process and the catalysts are of more general application. These same catalysts may be used to catalyze the reactions between water vapor and the chlorinated or brominated toluenes, xylenes, diphenyls, naphthalenes, etc.; for instance, the reaction of water vapor with parachlortoluene to give paracresol, or the reaction of water vapor with parachlordiphenyl to give paraphenylphenol. The reaction is general for halogenated carbocyclic compounds. It is therefore recognized that many modifications and substitutions may be made and it is desired that the invention be construed as broadly as the claims, taken in conjunction with the prior art, may allow.

I claim:

1. A method for converting a ring halogenated carbocyclic compound to the corresponding hydroxy compound, including a catalytic reaction with a salt having in the positive radical a metal of the group magnesium, aluminum, calcium, copper, zinc, scandium, and having in the negative radical an element of the group silicon, phosphorous, sulphur, and chlorine.

2. A method for converting a ring halogenated carbocyclic compound to the corresponding hydroxy compound, including a catalytic reaction with a copper salt and an amorphus compound.

3. A method for converting a ring halogenated carbocyclic compound to the corresponding hydroxy compound, including a catalytic reaction with a copper salt and an aluminum salt.

4. A method for converting a ring halogenated carbocyclic compound to the corresponding hydroxy compound, including a catalytic reaction with a plurality of salts, one of the said salts having in the positive radical a metal of the group magnesium, aluminum, calcium, copper, zinc, scandium, and in the negative radical an element of the group silicon, phosphorus, sulphur, and chlorine, and another of the salts being an amorphous compound.

5. In a method of making a carbocyclic hydroxy compound from the corresponding ring halogenated cyclic compound, the step of passing the vaporized halogenated compound and water vapor in contact with a catalyst including a salt having in the positive radical a metal of the group magnesium, aluminum, calcium, copper, zinc, scandium, and in the negative radical an element of the group silicon, phosphorus, sulphur, and chlorine.

6. In a method of making a carbocyclic hydroxy compound from the corresponding ring halogenated cyclic compound, the step of passing the vaporized halogenated compound and water vapor in contact with a catalyst including a copper salt and an amorphous compound.

7. In a method of making a carbocyclic hydroxy compound from the corresponding ring halogenated cyclic compound, the step of passing the vaporized halogenated compound and steam in contact with a catalyst including a salt having in the positive radical a metal of the group magnesium, aluminum, calcium, copper, zinc, scandium, and in the negative radical an element of the group silicon, phosphorus, sulphur and chlorine, and maintaining the catalyst at substantially 500° C.

8. In a method of preparing a catalyst for converting a ring halogenated cyclic compound to the corresponding hydroxy compound, the step of precipitating a catalytic salt in the presence of an amorphous compound containing a catalytic element, said catalytic salt having a positive radical including a metal of the group magnesium, aluminum, calcium, copper, zinc, and scandium, and a negative radical containing at least one of the radicals of the group silicate, phosphate, sulphate, and chloride having a low solubility.

9. A method of converting a ring halogenated cyclic compound to the corresponding hydroxy compound including a catalytic reaction with a catalyst precipitated from a cold solution a catalytic salt having in the positive radical a metal of the group magnesium, aluminum, calcium, copper, zinc, and scandium, and a negative radical containing an element of the group silicon, phosphorus, sulphur, and chlorine having a low solubility.

10. In a method of preparing a catalyst effective in converting a ring halogenated cyclic compound to the corresponding hydroxy compound, the step of removing from a solution a catalytic salt in the presence of a solid composition containing a catalytic element, said catalytic salt having a positive radical including a metal of the group magnesium, aluminum, calcium, copper, zinc, and scandium, and negative radicle containing at least one of the radicles of the group silicate, phosphate, sulphate, and chloride.

11. A method for converting a ring halogenated carbocyclic compound to the corresponding hydroxy compound including a catalytic reaction with a catalyst operable under non-alkaline conditions and including a chemical compound having in the positive radical a metal of the group magnesium, aluminum, calcium, copper, zinc, and scandium.

12. A method for converting a ring halogenated carbocyclic compound to the corresponding hydroxy compound including a catalytic reaction with a catalyst operable under acidic conditions and including a chemical compound having in the negative radical an element of the group silicon, phosphorus, sulphur, and chlorine.

13. A method for converting a ring halogenated carbocyclic compound to the corresponding hydroxy compound including a catalytic reaction with a catalyst operable under non-alkaline conditions and including a chemical compound having in the positive radical a metal of the group magnesium, aluminum, calcium, copper, zinc, scandium, and having in the negative radical an element of the group silicon, phosphorus, sulphur, and chlorine.

14. The process of producing aromatic hydroxy-compounds comprising the treatment of a ring-chlorinated aromatic hydrocarbon with steam at temperatures exceeding 350° C. in the presence of a compound of phosphoric acid with an element of group 2 of the periodic system as a catalyst.

15. The process for producing aromatic hydroxy-compounds comprising the treatment of a ring-chlorinated aromatic hydrocarbon with steam at temperatures exceeding 350° C. in the presence of a neutral phosphoric acid compound of an alkaline earth metal as a catalyst.

16. The process for producing aromatic hydroxy-compounds comprising the treatment of a ring-chlorinated aromatic hydrocarbon with steam at temperatures exceeding 350° C. in the presence of tricalcium phosphate as a catalyst.

17. The process for producing phenol comprising the treatment of chlorobenzene with steam at temperatures exceeding 350° C. in the presence of tricalcium phosphate as a catalyst.

18. The process for producing aromatic hydroxy-compounds comprising the treatment of a ring-chlorinated aromatic hydrocarbon with steam at temperatures between 350 and 650° C. in the presence of a compound of phosphoric acid with an element of group 2 of the periodic system as a catalyst.

19. The process for producing aromatic hydroxy-compounds comprising the treatment of a ring-chlorinated aromatic hydrocarbon with steam at temperatures between 350 and 650° C. in the presence of a neutral phosphoric acid compound of an alkaline earth metal as a catalyst.

20. The process for producing aromatic hydroxy-compounds comprising the treatment of a ring-chlorinated aromatic hydrocarbon with steam at temperatures between 350 and 650° C. in the presence of tricalcium phosphate as a catalyst.

21. The process for producing phenol comprising the treatment of chlorobenzene with steam at temperatures between 350 and 650° C. in the presence of tricalcium phosphate as a catalyst.

22. Method of converting a ring halogenated carbocyclic compound to the corresponding hydroxy compound which comprises reacting the halogenated compound with steam in the presence of a salt having in the positive radical a metal whose oxide is weakly basic and having in the negative radical an element of the group consisting of silicon, phosphorus, sulphur and chlorine.

LAWRENCE V. REDMAN.

CERTIFICATE OF CORRECTION.

Patent No. 2,311,777. February 23, 1943.

LAWRENCE V. REDMAN.

It is hereby certified that error appears in the printed specification of the above numbered patent requiring correction as follows: Page 3, first column, line 74, claim 8, and second column, line 9, before the word "having" insert --and--; line 11-12, claim 10, for "effectice" read --effective--; and that the said Letters Patent should be read with this correction therein that the same may conform to the record of the case in the Patent Office.

Signed and sealed this 20th day of April, A. D. 1943.

(Seal)

Henry Van Arsdale,
Acting Commissioner of Patents.